United States Patent [19]

Cuneo

[11] 4,328,405
[45] May 4, 1982

[54] TRIGGER SWITCH AND PRINTED CIRCUIT BOARD ARRANGEMENT FOR A PORTABLE TOOL

[75] Inventor: Giuseppe Cuneo, Calolziocorte, Italy

[73] Assignee: Black & Decker Inc., Newark, Del.

[21] Appl. No.: 186,307

[22] Filed: Sep. 11, 1980

[30] Foreign Application Priority Data

Sep. 12, 1979 [IT] Italy .............................. 22514/79[U]

[51] Int. Cl.³ .......................................... H01H 13/08
[52] U.S. Cl. .................................... 200/157; 200/243
[58] Field of Search .................. 200/157, 159 A, 243, 200/292

[56] References Cited

U.S. PATENT DOCUMENTS

| | | | |
|---|---|---|---|
| 3,591,740 | 7/1971 | Kolster | 200/157 |
| 3,594,523 | 7/1971 | Frienzel | 200/157 |
| 3,639,822 | 2/1972 | Brown et al. | 200/157 |
| 3,769,480 | 10/1973 | Lee | 200/157 |
| 3,928,741 | 12/1975 | Comer | 200/159 R |
| 4,095,072 | 6/1978 | Piber | 200/157 |
| 4,100,383 | 7/1978 | Piber | 200/157 |
| 4,276,460 | 6/1981 | Haesly et al. | 200/292 |

FOREIGN PATENT DOCUMENTS

| | | |
|---|---|---|
| 2438814 | 10/1977 | Fed. Rep. of Germany . |
| 2631431 | 1/1978 | Fed. Rep. of Germany . |
| 2745109 | 4/1979 | Fed. Rep. of Germany . |
| 429889 | 8/1967 | Switzerland . |
| 559966 | 3/1975 | Switzerland . |

*Primary Examiner*—Willis Little
*Attorney, Agent, or Firm*—Walter Ottesen; Edward D. Murphy; Harold Weinstein

[57] ABSTRACT

There is disclosed a hand-held portable tool which is driven by an electric motor from a source of electricity. The tool has a housing for the motor which has a commutator which extends into a hollow handle. The hollow handle has mounted therein a printed-circuit board having electrically conductive pathways. An electric switch is mounted on the board and incorporates a bridging element which engages contact terminals on the printed-circuit board when the switch is manually actuated thereby closing the electric circuit of the tool motor. In this way, separate electrical connections to the switch assembly per se are avoided and substantial time in assembly of the tool is saved.

10 Claims, 7 Drawing Figures

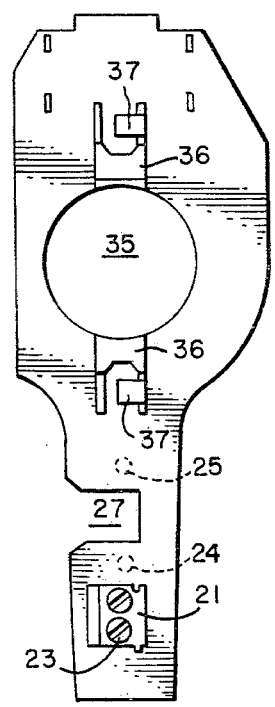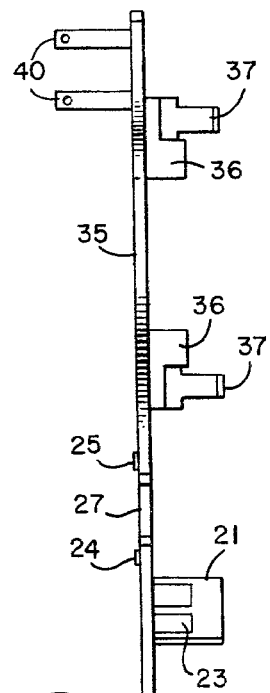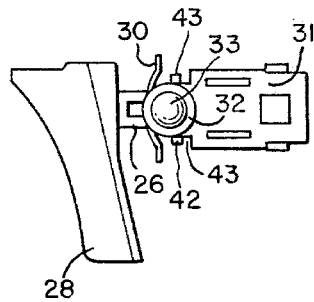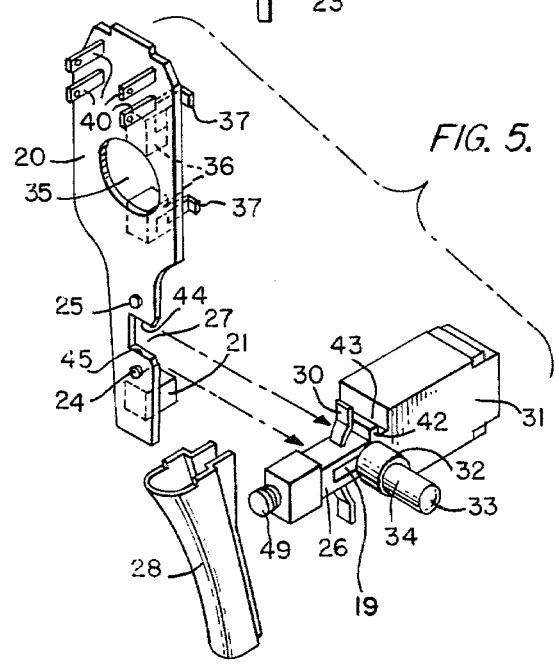

TRIGGER SWITCH AND PRINTED CIRCUIT BOARD ARRANGEMENT FOR A PORTABLE TOOL

BACKGROUND OF THE INVENTION

The principles embodied in hand-held portable electric tools are well known. Essentially they include a housing for the electric motor and the appurtenant elements for supplying and controlling the electrical energy needed to supply the electric motor. Usually such control means are located in the hollow handle which is usually of the pistol grip type, the main body being occupied by the electric motor. Such electric control means usually encompasses a separate switch with which there is operatively associated an actuating trigger and frequently a lateral locking pushbutton to retain the tool in its energized state when desirable. Suitable and necessary linkages are supplied to make it possible to operate the tool.

The trigger switch arrangement just mentioned is usually a separate component of the tool which is usually mounted on means located internally of the handle. Likewise electric terminal blocks as receivers of electricity from an outside source of electricity are necessary. But these too must also be suitably mounted internally of the hollow handle. Additionally, the assemblies for supplying electricity to the commutator of the electric motor must also be suitably mounted. Any additional speed control electronics such as a thyristor must be accounted for within internal mounting means of the hollow handle. Finally, all of these stated electrical components require suitable wiring one from the other. In the conventional arrangement, the trigger switch too must be wired into the tool and somehow mounted into the tool body often with screws or other fastening means. The assembly of the switch into the tool body requires additional assembly time and effort.

BRIEF SUMMARY OF THE INVENTION

In order to reduce assembly time in the manufacture of the tool, the present invention contemplates the utilization of suitably printed circuit boards. The printed-circuit boards are designed to not only provide the electrical pathways for distribution of the energy to components requiring electrical energy but also to provide support to the various components.

More specifically, the invention contemplates an arrangement for a portable tool including a trigger switch which is conveniently mounted proximate the printed-circuit board and to which no electrical wires have to be connected.

Therefore, and according to a preferred embodiment of the invention, the switch assembly is inserted into a slot provided in the board. The switch assembly includes a leaf-spring bridging element which can be actuated upon pressing the trigger of the switch. The switch assembly is mounted in such a way that the movable leaf-spring bridging element contacts a set of contact buttons provided as terminals on the printed-circuit board. To this end, the body of the switch assembly disclosed and utilized is provided with a crosswise slot for insertion into the slot of the board.

In this way, the switch assembly is conveniently mounted in the tool and separate electrical connections to the switch assembly per se are avoided and substantial time in assembly of the unit is saved.

BRIEF DESCRIPTION OF THE DRAWINGS

The invention will now be described with reference to the drawing wherein:

FIG. 2 is an end view of the mounting printed-circuit board showing the slot for receiving the trigger switch;

FIG. 3 is a side elevation of the mounting printed-circuit board;

FIG. 4 is a side elevation of the trigger switch assembly of one embodiment wherein the switch assembly has one leaf-spring electrical bridging element;

FIG. 5 is an exploded view showing the structure and inter-relationship of the components;

DETAILED DESCRIPTION OF THE INVENTION

Figure 1:
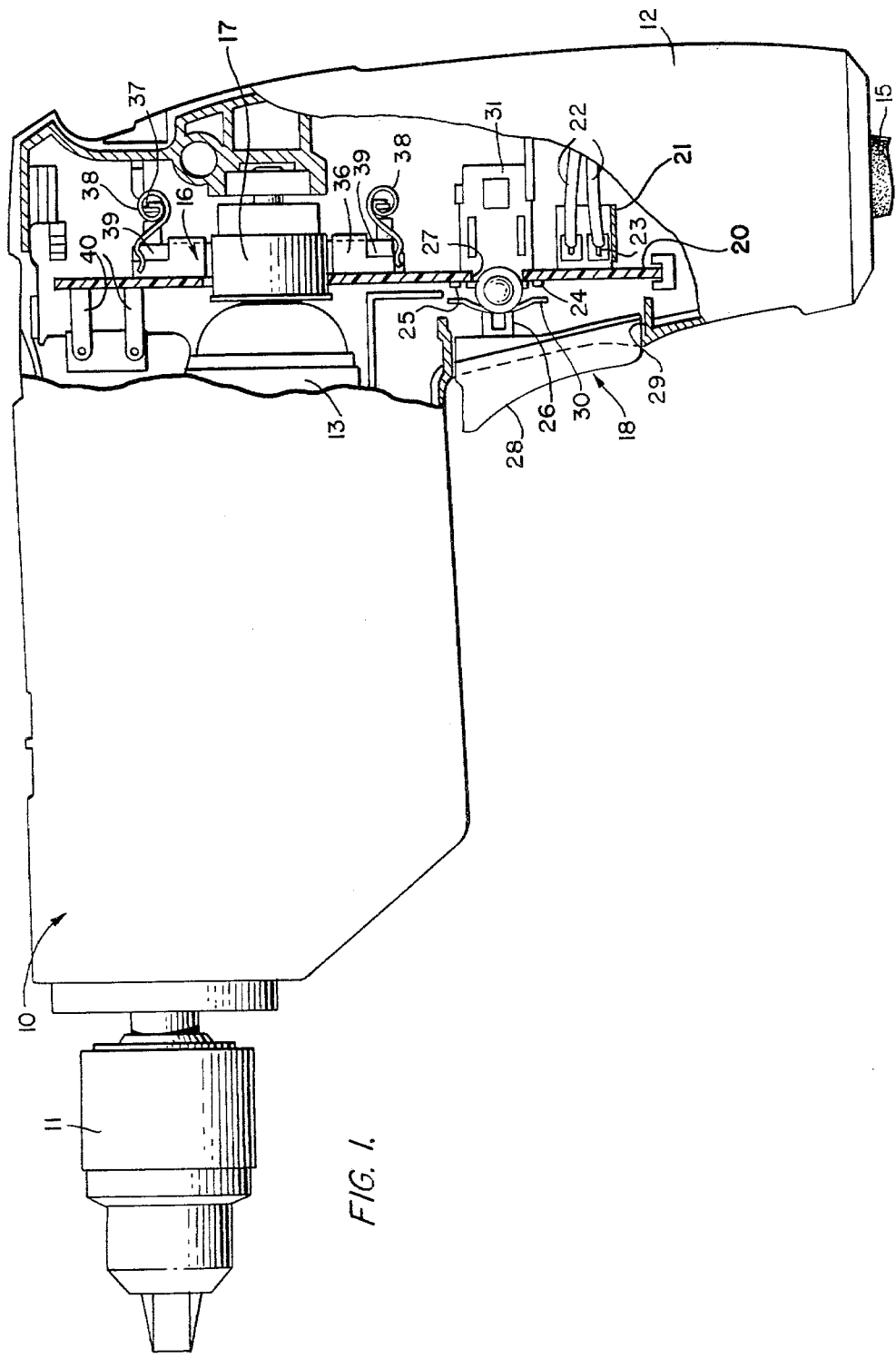
FIG. 1 is a side elevation of a portable electric drill with a portion of the housing broken away to show the trigger switch and printed-circuit board arrangement for a portable tool.

Now, turning to FIG. 1, it will be noted that the inventive principles hereinafter to be discussed are applicable to a conventional drill 10 shown in a general manner. The drill 10 has a conventional chuck 11 at the left side of the drawing. A pistol type handle 12 is located at the right side. Intermediate therebetween is an electric motor 13. The electric motor 13 and the parts in the handle are mounted in a housing 14, usually constructed of clam shell molded parts of approximately equal volume. An electric cord 15 depends from the handle which goes to a suitable source of electricity.

From FIG. 1, it will be seen that all of the electrical components including the wiring, the trigger switch assembly 18 and the commutator contact assemblies 16 for the commutator 17 are mounted on a printed-circuit board 20.

In FIG. 1 an elongated printed circuit board 20 is positioned axially with respect to the pistol grip handle 12. The board 20 can be constructed of conventional materials such as fiberglass polyester laminate. The board 20 has been printed on one or both surfaces with a metal, or other conductive material, a series of electrical pathways which supply electric current from a point of ingress to points of use.

For instance, at the bottom portion of the board 20 is a conventional two terminal block 21 to which two electric wires 22 are connected. The conductive pathways on the board 20 (not shown) interconnect the terminals with the motor 13 and the contact buttons 24 and 25. It will be noted that the respective contact buttons are positioned on the other side of the board to that of the terminal block 21. The contact buttons 24, 25 can be viewed as constituting terminal means.

The board 20 in the vicinity of the contact buttons 24, 25 is supplied with the trigger switch assembly 18 which fits into a horizontal slot 27 in the board 20 which slot is located inbetween the aforementioned contact buttons.

The switch assembly 18 incorporates manually actuable means including a trigger 28 connected to a plunger 26. The plunger 26 is slideably mounted in a housing 31 of the assembly and is spring-loaded by spring (not shown) so that it is urged to left in the normally open position of the trigger switch.

The plunger 26 moves perpendicularly with respect to the board 20 when manually actuated by the operator. The plunger 26 terminates in the outwardly facing trigger 28 that extends through a forwardly facing opening 29 in the handle 12 and essentially fits sufficiently tightly to inhibit the entrance of dirt and grime into the housing 14. The plunger 26 is adapted to carry contact means in the form of an arcuate leaf-spring bridging element 30 that completes the electric pathway when the trigger 28 is depressed against the pressure of the spring. The electric pathway is completed between buttons 24 and 25 when the leaf-spring bridging element 30 contacts said contact buttons. When the trigger 28 is released, the spring in the housing returns the plunger 26 to the position shown in FIG. 1 whereby the circuit between contacts 24 and 25 is once again open.

The aforementioned housing 31 has a forwardly extending portion 42 (seen in FIG. 5) that is dimensioned to fit into the slot 27. The forwardly extending portion has perpendicular thereto a small housing 32 having a spring-loaded button 33 with a short secondary plunger 34 that may be depressed when the plunger 26 has been moved so that to make electric contact whereby the main plunger 26 can be retained in that position without further need to hold the trigger 28. The plunger 26 has a recess 19 into which the secondary plunger 34 moves when the button 33 is depressed, which secondary plunger 34 is suitably held in position by a detent arrangement not shown) thereby acting as a stop for the main plunger 26. The secondary plunger 34 as a stop is defeated by depressing the trigger 28 slightly more to thereby release the secondary plunger 34 from its position as a stop. The trigger 28 may then be released and, as the way is now clear, the plunger, trigger and the electric contacts will move to its normal open, i.e., off position.

It will be seen that there are additional components located on the board 20 above the electric switching elements. It is necessary to view these additional components in the light of other figures as well, especially, for instance, FIGS. 2, 3, 4 and 5. The view of the rear of the board as shown in FIG. 2 depicts the board having a relatively large circular opening 35 through which the commutator 17 of the electric motor projects.

At points 180° apart are two carbon brush holders 36 in which carbon brushes 39 are held in position against the commutator 17. The holders are constructed of conducting metal and have metal projections 37 to which spiral clock springs 38 are attached having an active end which impinge resiliently on the surface of the carbon brushes 38 opposite to the surfaces presented to the commutator 17. The manner in which this set up finds utilization can be seen from FIG. 1. The carbon brushes 39 are thereby retained in the carbon brush holders 36. Suitable electric conductive pathways are provided on the printed-circuit board to supply electricity to the carbon brush holders when the aforementioned switch 18 is in a closed circuit position.

Opposite to the side of the board 20 are a plurality of perpendicularly extending electric connector members 40 designed to supply electricity to the stator (not shown) of the electric motor 13. Suitable electrically conducting pathways are provided on the board to supply electricity to the connector members when the switch 18 is in a closed or on position.

Turning to FIG. 5, it will be noted that the aforementioned forwardly extending portion 42 of the housing 31 has an upper and lower horizontal slots 43 which mate with the downwardly facing edge portion 44 and the upwardly facing edge portion 45 of the slot 27.

Thus, in this way, a most simple and convenient arrangement of mounting the switch assembly 18 on the printed-circuit board 20 is achieved which requires no separate wiring of leads to the switch assembly.

The trigger 28 is affixed to the plunger 26 by means of a forwardly extending knob 49 which fits into a rearwardly facing recess (not shown) rearward of the trigger 28.

It has been discovered to the efficacious to also provide a variable speed control for the drill. To accomplish this, a two button contact arrangement is provided as in the embodiment disclosed in FIGS. 1 to 5; however, a second set of two button contacts is provided for a second leaf-spring electrical bridging element. Accordingly, attention is now directed to FIGS. 6 and 7 wherein the additional embodiment is illustrated.

Figures 6, 7:
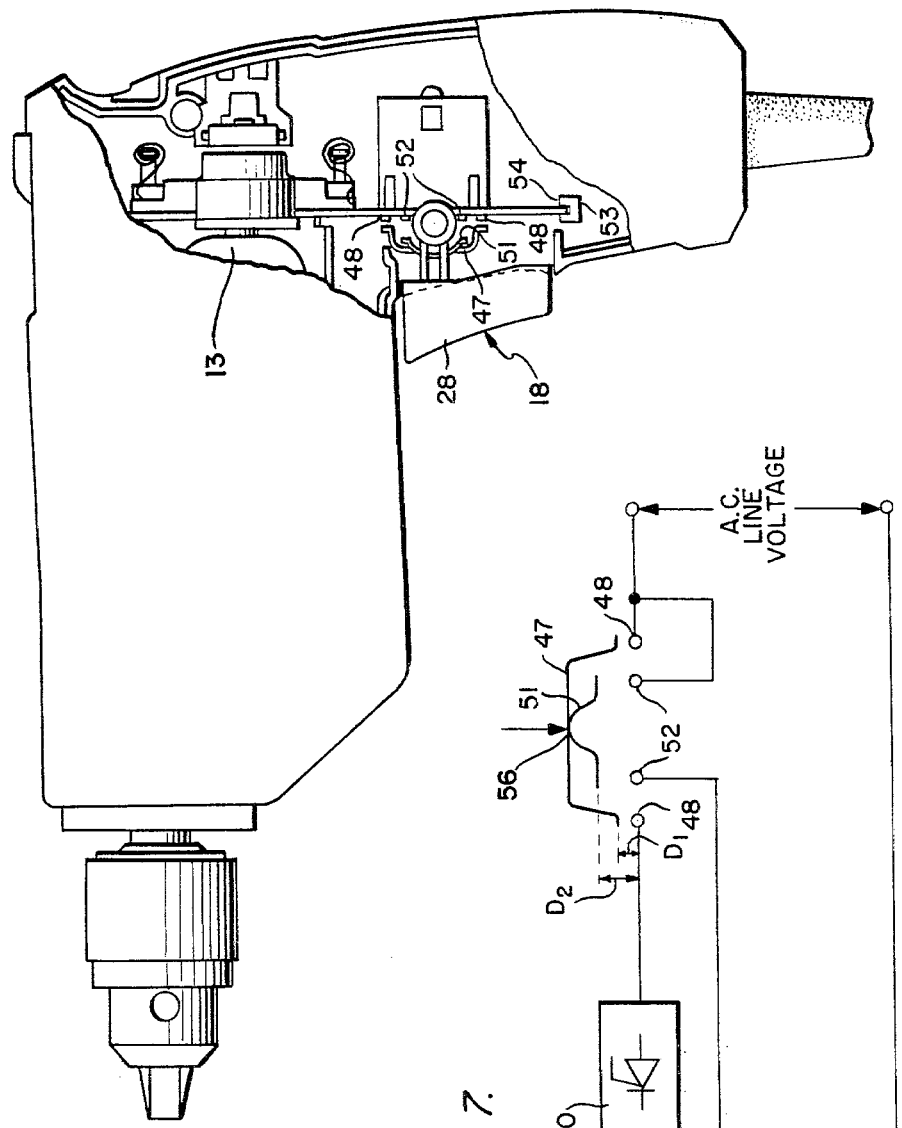
FIG. 6 is a similar view as in FIG. 1 to illustrate another embodiment wherein the trigger switch assembly is provided with two leaf-spring electrical bridging elements.
FIG. 7 is a schematic wiring diagram employed in carrying out the principles of the second embodiment.

In regard thereto, the switch is essentially as hereinbefore depicted. However, it will be noted that the spring-loaded plunger operable by depressing the trigger moves a first leaf-spring bridging element 47 into contact with a first set of contact buttons 48. The contact buttons 48 are in an electric pathway to supply electricity to the electric motor 13 of the drill through a conventional thyristor speed controller 50. The board 20 is also supplied with a second set of contact buttons 52 and the switch assembly 18 with a second leaf-spring bridging element 51 as shown in FIG. 6. The two leaf-spring bridging elements are connected together centrally at 56 as shown in FIG. 7. Suitable electrically conductive pathways are provided on the board.

Attention is directed to the circuit diagram shown in FIG. 7. Note that when the first leaf-spring bridging element 47 completes its contact with contact buttons 48 electricity flows through a thyristor speed controller 50 which controls the speed of the motor 13. Further, when the trigger 28 is depressed further, the second leaf-spring bridging element 51 completes contact with the second set of contact buttons thereby shorting out the thyristor so that full live voltage is supplied to the motor. It will be seen that when the trigger-plunger moves distance $D_1$ the thyristor speed controller 50 is in circuit and that when the trigger-plunger moves a total of $D_2$ the thyristor speed controller 50 is shorted out of circuit.

It will be appreciated that numerous means may be employed to suitably mount the printed-circuit board 20 in the housing. A suitable construction is to provide ridge portions (not shown) with appropriate longitudinal grooves internally each of the clam shell moldings so that when the moldings are secured together, the board is transversely located between the clam shell moldings. Additionally, these ridges 53 may be constructed to have portions perpendicular to the internal walls of the housing wherein a groove 54 may be located to accept and retain the bottom portion of the board 20. A similar construction may be accomplished in association with the top of the board.

I claim:
1. A hand-held portable electric tool, comprising:
   an electric motor;
   a printed-circuit board for connecting electrical supply current to the motor;

at least two terminals on the printed-circuit board through which a circuit to the motor is closed when said terminals are electrically connected;

a switch assembly mounted directly upon said printed-circuit board and comprising manually actuatable means, contact means, and a housing;

said manually actuatable means including a plunger movable in a direction transverse to the flat surface of the printed-circuit board, said plunger being slidably mounted in said housing; and said contact means comprising a resilient bridging element mounted on said plunger for electrically bridging said terminals when said actuatable means is moved toward said printed-circuit board, said bridging element and said housing being disposed on opposite sides of said printed-circuit board.

2. The tool of claim 1, wherein there are two pairs of said terminals on said printed-circuit board; and said contact means has two of said bridging elements arranged such that upon operation of said actuatable means one of said elements bridges one pair of said terminals, and then in sequence with continued operation of said actuatable means the other said element bridges the other pair of said terminals to also complete a second circuit.

3. The tool of claim 2, wherein the circuit having said one pair of terminals has means for controlling the amount of electric energy therein, whereby the speed of said motor is controlled.

4. The tool of claim 3, wherein said means for controlling the amount of electrical energy is a thyristor.

5. The tool of claim 1, wherein the printed-circuit board has a slot in the periphery thereof, and said switch housing has two slots transverse to the direction of movement of said plunger, said two slots engaging opposed edge portions of said slot in the printed-circuit board to firmly hold said switch assembly on said printed-circuit board.

6. A hand-held portable electric tool, comprising:
a housing having a motor compartment and a handle;
an electric motor housed in said motor compartment;
a printed-circuit board mounted in said housing and electrically connected to said motor;
a switch assembly having a manually actuatable part connected to a plunger slidable in a switch housing mounted on said printed-circuit board, said actuatable part and said switch housing being disposed on opposite sides of said printed-circuit board;
said plunger having mounted thereon a bridging element disposed between said manually actuatable part and said switch housing, and said plunger being resiliently biased to urge said bridging element away from said switch housing; and
a pair of terminals on said printed-circuit board adjacent said plunger, whereby operation of said actuatable part moves said bridging element towards and into contact with said terminals to close a circuit to said motor.

7. The tool of claim 6, wherein said switch assembly includes a secondary plunger movable perpendicular to said plunger slidable in said switch housing for releasably retaining said latter plunger in a position in which said circuit is closed.

8. The tool of claim 6, wherein said printed-circuit board has mounted thereon a terminal block spaced from said switch housing and arranged to be connected to an outside source of electricity for operating said tool.

9. A hand-held portable electric tool, comprising:
a housing having a motor compartment and a handle;
an electric motor housed in said motor compartment;
a printed-circuit board mounted in said housing and electrically connected to said motor;
a switch assembly having a manually actuatable part connected to a plunger slidable in a switch housing mounted on said printed-circuit board and extending therefrom away from said actuatable part;
said plunger having mounted thereon two bridging elements both disposed between and manually actuatable part and said printed-circuit board, and said plunger being resiliently biased to urge said bridging elements away from said printed-circuit board; and
two pairs of terminals on said printed-circuit board adjacent said plunger, whereby operation of said actuatable part first moves one of said bridging elements towards and into contact with one pair of said terminals to close a first circuit to said motor, and then continued operation of said actuatable part moves the other of said bridging elements into contact with the other pair of said terminals to additionally close a second circuit to said motor.

10. A hand-held portable electric tool, comprising:
a housing having a motor compartment and a handle compartment extending transversely from said motor compartment;
an electric motor housed in said motor compartment;
an elongate printed-circuit board extending in a plane transversely to the axis of rotation of said motor, and extending across said motor comparmtent into said handle compartment, said circuit board being electrically connected to said motor;
mounting means in said handle compartment engaging the lower end of said printed-circuit board thereby securing said lower end in position;
a switch assembly mounted in said handle compartment and having a manually actuatable trigger mounted on a plunger slidable in a switch housing having no electrical connection thereto, said switch housing having upper and lower slots therein, and said plunger having mounted thereon a bridging element disposed between said trigger and said switch housing;
a horizontal slot in one edge of said printed-circuit board, said upper and lower slots mating respectively with downwardly facing and upwardly facing edge portions of said horizontal slot to firmly mount said switch assembly on said printed-circuit board; and
a pair of terminals on said printed-circuit board, one on each side of said horizontal slot;
whereby operation of said trigger moves said bridging element toward and into contact with said terminals to close a circuit to said motor.

* * * * *